July 3, 1951  L. ZAIGER  2,559,208
WINDSHIELD WIPER MECHANISM
Filed Nov. 29, 1949

Inventor
Louis Zaiger
by Roberts, Cushman & Grover
Att'ys

Patented July 3, 1951

2,559,208

UNITED STATES PATENT OFFICE 2,559,208

WINDSHIELD WIPER MECHANISM

Louis Zaiger, Swampscott, Mass.

Application November 29, 1949, Serial No. 129,989

8 Claims. (Cl. 74—78)

This invention relates to improvements in motor driven windshield wipers and more especially to the wiper blade oscillating mechanism.

One desirable way of imparting oscillatory movement to the wiper blade shaft of a motor driven wiper is to employ a rack and pinion drive wherein the pinion is fixed to the blade shaft and the rack is reciprocated by way of suitable kinematic means connecting it to a motor. The means for imparting reciprocation to the rack may be a cam, eccentric or crank. Such drives, however, impart not only the linear reciprocation desired for oscillating the pinion but a secondary angular motion which make it difficult to hold the rack and pinion in mesh and at the same time permit freedom of relative movement between them. Heretofore two general methods have been employed to keep the rack in intimate contact with the pinion gear, during the relative movement between the two and at all positions of angularity, both of which have proved inadequate in some respects. One method was to place a guide pin or roll in a given position with respect to the pinion so that the rack was held between the guide pin or roll and the pinion in all positions of relative movement. The particular position chosen for the guide pin or roll was at best only a compromise for the many angular positions of the rack and since the angular displacement is always large, there is bound to be considerable clearance between the pin or roller and rack in some positions of the angular movement of the rack. Thus the teeth are not always fully engaged and hence overloading of the tooth tips of both the rack and gear take place with early failure of the teeth. The other method was to use a rack guide swingable about the rack pinion center. To be effective the guide had to fit the rack closely and was forced to assume an angular position corresponding to that of the rack by the motion of the rack itself. Unfortunately, at the extreme positions of angular motion the rack guide tended to become wedged.

The principal objects of the present invention are to provide an improved rack guide for use in a wiper motor mechanism, embodying a rack and pinion drive as described above, which will be free of binding and/or excessive clearance, thereby prolonging the life of the operating parts, which can be contained in the comparatively limited space available in the wiper housing and further to provide a simple and inexpensive device which can be used in existing wipers of the foregoing kind to overcome their disadvantages without excessive modification of their mechanism and without sacrificing any of their advantages of construction.

As illustrated herein, the foregoing advantages are secured by incorporating in the rack and pinion drive a positively driven keeper guide for holding the rack teeth in good but not binding engagement with the pinion teeth of the pinion on the blade shaft at all positions of relative movement therebetween. To this end the keeper guide and rack having slidably engaging portions, situated so that the rack portion is between the keeper guide portion and the pinion and are parallel to each other and to the rack teeth. The keeper guide is moved angularly to cause the rack engaging portion thereof to move angularly in synchronism with the rack so that the slidably engaging portions of the rack and keeper guide remain parallel throughout the relative linear and angular movement of the rack and pinion. The keeper guide is pivoted for movement about the axis of the pinion shaft and is oscillated angularly independently of the rack by connection to the means which impart movement to the rack. The foregoing means as hereinafter will be shown, may be an eccentric, cam or crank continuously driven in rotation by a motor.

The invention will now be described in greater detail with reference to the accompanying drawings wherein.

Figure 2:
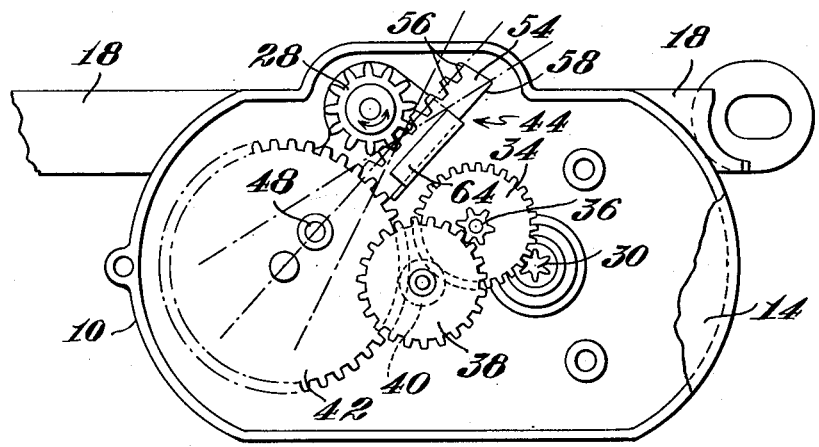
Fig. 2 is a plan view looking down on top of Fig. 1 with the outer cover omitted except for a fragmentary portion at one end.

Referring to the drawings, the windshield wiper assembly is illustrated as comprising a hollow aluminum casting 10 which supports a wiper arm 12 and the operating mechanism for oscillating the arm. Cover plates 14 and 16 are bolted to the opposite sides of the casting to enclose the operating mechanism except for the wiper arm. One of the cover plates 16, the rear one, has cast integral therewith spaced brackets 18 by which the device may be attached in place adjacent to the windshield or back window of a motor vehicle. The wiper blade arm is fastened for oscillation to one end of a wiper shaft 20 which projects from the rear cover 16. The ends of the shaft 20 are journaled in the cover plate 16 and a partition 22, near the opposite side of the casting, which divides the latter into two chambers, a comparatively deep chamber 24 which houses the motor and is closed by the cover 16 and a shallow chamber 26 which contains the mechanism for transmitting the rotary motion of the motor shaft to the wiper shaft and is closed by the outer cover 14. The end of the wiper shaft 20 journaled in the partition 22 projects therethrough into the shallow chamber 26 and has fixed to it a pinion 28. The pinion 28 is oscillated so as to oscillate the wiper arm by a train of gears, situated in the shallow chamber, interposed between it and a pinion gear 30 fastened to a shaft 32 of a motor M mounted within the chamber 24. The motor M herein illustrated is electric but it is to be understood that other kinds of motors may be used, for example, vacuum, hydraulic, etc.

Figure 1:
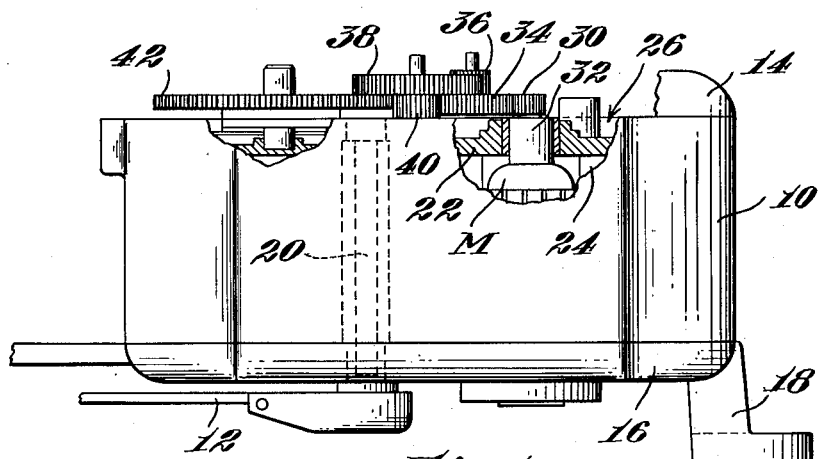
Fig. 1 is a side elevation of the wiper broken away in part and with the outer cover omitted except for a fragmentary portion at one end.

The intervening gear train Figs. 1 and 2 comprises a fiber gear 34 meshing with the pinion 30, a metal pinion 36 fixed to the top side of the gear 34, a second fiber gear 38 which meshes with the pinion 36, a metal pinion 40 fixed to the under side of the gear 38 and a large metal gear 42 meshing with the pinion 40. Each of the gears is provided with one or more hubs or stubshafts by which it is journaled for rotation between the partition 22 and the outer cover 14.

Figure 5:
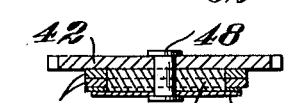
Fig. 5 is a vertical section taken on the line 5—5 of Fig. 3.
Figure 3:
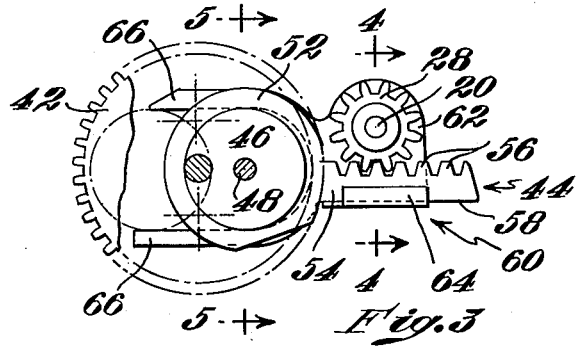
Fig. 3 is a top plan view of the rack and pinion drive for the wiper shaft, including the improved rack keeper guide, with the eccentric gear broken away.

The rotary motion transmitted from the motor shaft to the gear 42 is then transformed to linear reciprocation by a rack bar 44, Fig. 1. To this end a circular disk 46, Figs. 3 and 5, is fastened by a rivet 48 to the underside of the gear 42 with its center spaced from the center of the gear so as to provide an eccentric. There is also fastened to the underside of the gear 42 beneath the eccentric disk by means of the same rivet a thin retainer plate 50 having a somewhat larger diameter than the eccentric disk. The rack bar 44 comprises a pair of flat metal stampings each of which consists of an annular follower 52 which is adapted to encircle the eccentric disk between the retainer plate 50 and the gear and a stem 54 integral therewith having parallel sides, one side of which has teeth 56 cut therein for engagement with the pinion 28 and the other side of which is provided with a straight smooth surface parallel to the root line of the teeth. The rack 44 as herein illustrated is made of two pieces so that the parts may readily be stamped from sheet metal. It is to be understood, however, that the rack may be made from a single piece of metal.

As thus constructed rotation of the gear 42 moves the rack 44 linearly in reciprocation a distance which is twice the distance between the centers of the gear and the disk. During this linear reciprocation however the rack is also oscillated angularly since the center of the eccentric 44 moves in a circle about the center of the gear. Thus the rack will be oscillated first to one side and then to the other of the center of the gear a distance equal to the distance between the center of the gear and the center of the eccentric.

To keep the rack and pinion teeth in proper engagement throughout their relative movement it has heretofore been proposed to place a pin or roll against the back of the rack so that during movement of the rack it would be held in engagement with the pinion. The pin or roll would of course permit the rack to slide between it and the pinion and to rock relative to the pin. Since the angular movement of the rack is quite wide, whatever position is chosen for the pin or roll will not be equally good for all the various angular positions which the rack will occupy and hence at some points there will be too much clearance between the rack teeth and pinion teeth and at other points there will be not enough so that there will be binding. It has also been suggested to employ a keeper slidably engaged with the rack and pivoted for movement about the axis of the pinion, but this in like manner is unsatisfactory because the keeper depends for its angular movement upon the movement of the rack and there is binding between the keeper and the rack when the angular displacement is large.

Figure 4:
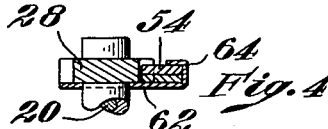
Fig. 4 is a vertical section taken on the line 4—4 of Fig. 3.
Figure 6:
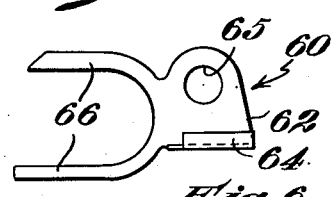
Fig. 6 is a plan view of the keeper.

In accordance with the present invention these difficulties have been eliminated by provision of a driven keeper guide 60 shown in Fig. 6 which consists of a flat plate 62 having a channel 64 for slidably embracing the smooth back 58 of the rack bar 44 substantially parallel to the teeth 56. The plate 62 has an aperture 65 therein adapted to fit over the hub on the under side of the pinion 28 Fig. 4 so that the keeper guide is pivotally anchored for movement about the axis of the pinion shaft 20. The distance between the back of the channel and the center of the aperture is chosen so that the rack stem will slide freely in the channel between that and the pinion with just the right amount of intermesh between the teeth of the rack and the pinion. Formed integral with the keeper guide 60 is a pair of parallel arms 66 adapted to embrace the eccentric disk 46 and to be situated between the lower follower 52 and the retainer plate 50. Thus as the gear 42 turns and the rack 44 is moved linearly and is oscillated angularly, the keeper guide 60 is also positively oscillated angularly in timed relation to the rack and in synchronism therewith so that the inner surface of the channel 64 follows the rear surface 58 of the rack bar 44 and is always parallel thereto regardless of the angular or linear positions of rack. Hence by providing a keeper guide which is positively driven independently of the rack the teeth of the rack and pinion may be held in proper mesh throughout the relative movement of the rack and pinion with no chance of either binding of the teeth at the extremities of the angular movement of the rack or of separation of the teeth at intermediate points so as to impose an excessive load on the points of the teeth.

While an eccentric disk 42 has been shown for the purpose of transmitting the motion of the gear 42 to the rack bar 44, it is apparent that a crank or cam could be used for this purpose and that the particular train of gears used to transmit rotational movement from the motor M to the gear 42 may be modified to a considerable extent to change the speed ration without modifying the scope of the invention as illustrated herein.

It should be understood that the present disclosure is for the purpose of illustration only and that this invention includes all modifications and equivalents which fall within the scope of the appended claims.

I claim:

1. In a wiper motor, a wiper blade shaft, a pinion fixed thereto, a rack bar meshing with the pinion and having reciprocating linear and angular movement relative to the pinion for effecting oscillation of the pinion, means operably connecting the rack bar to the motor for effecting movement of the rack bar, a keeper, guide means on the keeper slidably engaging the rack bar for holding the rack and pinion in mesh, the keeper engaged portion of the rack bar being situated between said guide means and the pinion, means operable independently of the rack bar for moving the keeper angularly in timed relation to the angular movement of the rack bar so that the slidably engaged portions are parallel throughout the relative movement of the rack bar and pinion and means operably connecting said last-named means to the motor for effecting operation thereof.

2. In a wiper motor, a wiper blade shaft, a pinion fixed thereto, a rack bar meshing with the pinion and having reciprocating linear and angular movement relative thereto for effecting oscillation of the pinion, means operably connecting the rack bar to the motor for effecting movement of the rack bar, a keeper pivotally anchored for movement about the axis of the pinion, guide means on the keeper slidably engaging a portion of the rack bar for holding the rack and pinion in mesh, the keeper engaged portion of the rack being situated between the keeper and the pinion, said keeper engaged portion of the rack bar partaking of a given angular motion with reference to the axis of the pinion, and means operably connecting the keeper to the motor for imparting a corresponding angular motion to said guide means independently of the rack bar, but in synchronism therewith.

3. In a wiper motor, a wiper blade shaft, a pinion fixed thereto, a rack bar meshing with the pinion and having reciprocating linear and angular movement relative thereto for effecting oscillation of the pinion, means operably connecting the rack bar to the motor for effecting movement of the rack bar, a keeper guide pivotally anchored for movement about the axis of the pinion, a way on the rack bar parallel to the rack teeth, a guideway on the keeper guide parallel to and slidably engaged with said way for holding the rack and pinion in mesh, said way being situated between the guideway and the pinion, and means operably connecting the keeper to the motor for imparting independent angular movement to the keeper and hence the guideway corresponding in kind and timing to that imparted to said rack way.

4. In a wiper motor, a wiper blade shaft, a pinion fixed thereto, a rack bar meshing with the pinion, means operably connecting the rack bar to the motor for imparting reciprocating linear and angular movement to the rack relative to the pinion to effect oscillation of the pinion, a keeper guide slidably engaging a portion of the rack bar parallel to the rack teeth, said keeper guide being pivoted for movement about the axis of the pinion, and means operably connecting the keeper to the motor independently of the rack bar for imparting angular movement thereto in synchronism with the angular movement of the rack bar.

5. In a wiper motor, a wiper blade shaft, a pinion fixed thereto, a rack bar meshing with the pinion, an eccentric operably connecting the rack bar to the motor for imparting reciprocating linear and angular movement thereto relative to the pinion to effect oscillation of the pinion, a keeper guide slidably engaging a portion of the rack bar parallel to the rack teeth, said keeper guide being pivoted for movement about the axis of the pinion and means operably connected to said eccentric and keeper for effecting angular movement therefrom independently of the rack bar, but corresponding in kind and timing to that imparted to the rack bar.

6. In a windshield wiper, a wiper shaft, a pinion fixed thereto, a rack bar meshing with the pinion, a rotatable eccentric, means for rotating the eccentric, including a motor, means operably connecting the rack bar to the eccentric whereupon rotation of the eccentric imparts both linear and angular reciprocation to the rack bar, a keeper guide pivotally anchored for turning about the axis of the pinion, a slide on the rack bar, a slide on the keeper guide mating with that on the rack bar, said slides being parallel to the rack teeth and to each other, and the former being situated between the latter and said pinion, and means operably connecting the keeper guide to the eccentric so that rotation of the eccentric imparts angular movement to said keeper guide slide correspondingly in kind and in synchronism with said rack bar slide.

7. In a windshield wiper, a wiper shaft, a pinion fixed thereto, a rack bar meshing with the pinion, an eccentric, means for rotating the eccentric including a motor, a follower connected to the rack, encircling the eccentric, whereupon rotation of the eccentric imparts both linear and angular reciprocation to the rack bar relative to the pinion, a keeper guide pivotally anchored for turning about the axis of the pinion, contacting relatively slidable surfaces on said rack and keeper guide parallel to the rack teeth and to each other, said surface on the rack bar being situated between the surface of the keeper and the pinion, and a fork on the keeper guide arranged to embrace the eccentric and to impart angular movement to the keeper guide surface independently of the rack bar but corresponding in kind and timing to said rack bar surface without imparting linear movement thereto.

8. In a windshield wiper, a wiper shaft, a pinion fixed thereto, a rack bar meshing with the pinion, a gear, a motor for effecting rotation of the gear, a disk fixed to the gear eccentrically thereof, a retainer plate fixed to the disk at the outer side thereof, a follower on the rack bar encircling the eccentric disk between it and the retainer plate so that the rotation of the gear imparts both linear and angular reciprocation to the rack bar relative to the pinion, a keeper guide pivotally anchored for turning about the axis of the pinion, contacting relatively slidable surfaces on said rack bar and keeper guide parallel to the rack teeth and to each other, said surface on the rack bar being situated between the surface of the keeper guide and the pinion, and a fork on the keeper guide arranged to embrace the eccentric disk between the follower and the retainer plate to impart angular movement to said keeper guide surface independently of the rack bar but corresponding in kind and timing to said rack bar surface without imparting linear movement thereto.

LOUIS ZAIGER.

REFERENCES CITED

The following references are of record in the file of this patent:

UNITED STATES PATENTS

| Number | Name | Date |
| --- | --- | --- |
| 2,002,790 | Orr | May 28, 1935 |